March 17, 1942.　　　D. L. GIBB　　　2,276,691
POLYMERIZATION METHOD
Filed Dec. 13, 1939
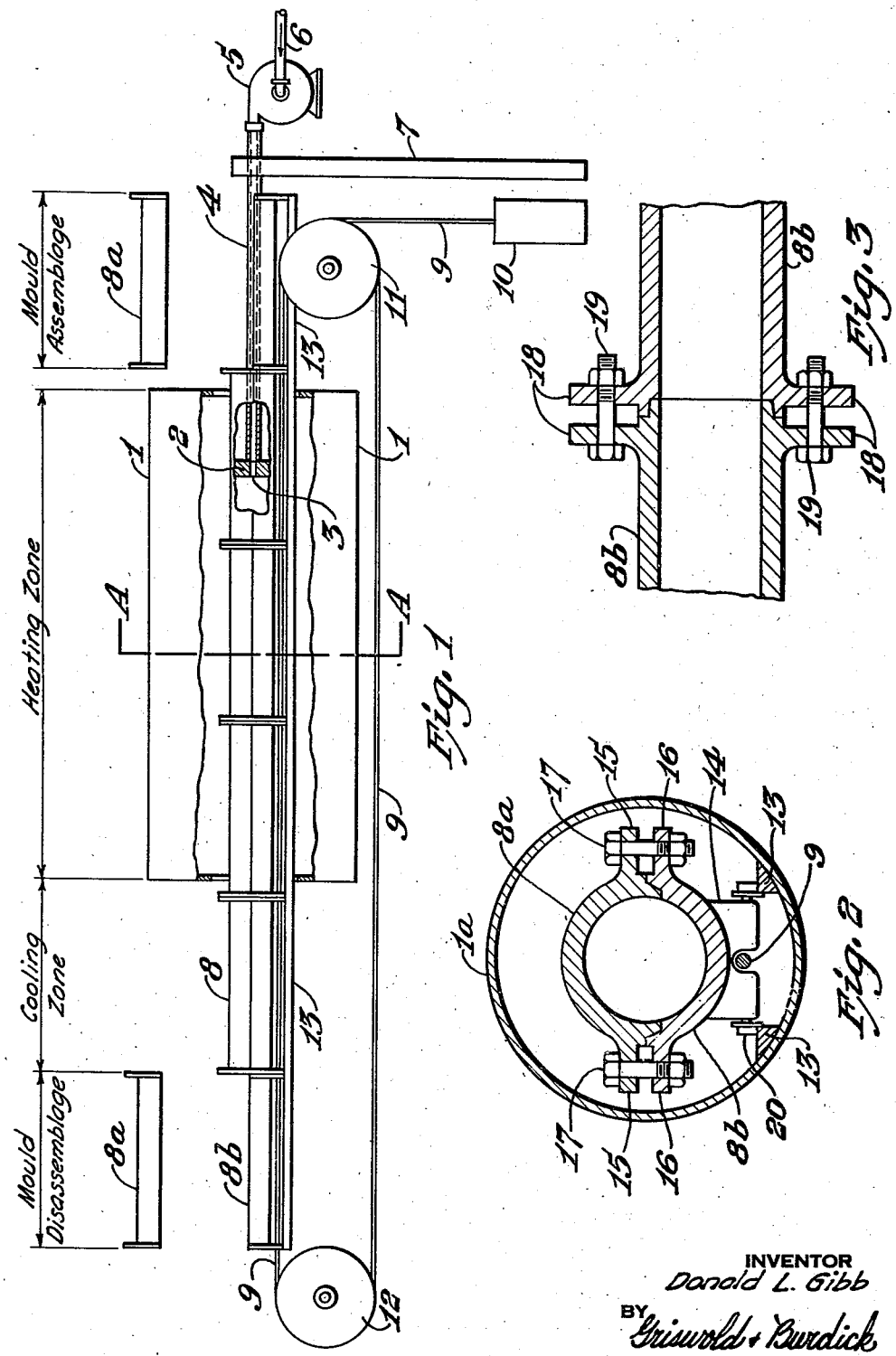
INVENTOR
Donald L. Gibb
BY Griswold + Burdick
ATTORNEYS Patented Mar. 17, 1942

2,276,691

UNITED STATES PATENT OFFICE 2,276,691

POLYMERIZATION METHOD

Donald L. Gibb, Midland, Mich., assignor to The Dow Chemical Company, Midland, Mich., a corporation of Michigan Application December 13, 1939, Serial No. 308,992

2 Claims. (Cl. 18—55)

This invention concerns an improved method for polymerizing unsaturated organic compounds to produce directly rods or bars, etc., of the polymer in a form substantially free of flaws and of any desired length.

The unsaturated organic compounds used as starting materials are those which are readily polymerized by heat to form solid glass-like resins. In most instances they are acrylic or vinyl compounds, e. g. methyl methacrylate, ethyl methacrylate, propyl methacrylate, vinyl acetate, vinyl butyrate, and vinyl aromatic compounds, such as styrene, ortho-chloro styrene, meta-chloro styrene, para-chloro styrene, para-bromo styrene, ortho-methyl styrene, meta-methyl styrene, ortho-ethyl styrene, meta-ethyl styrene, para-ethyl styrene, diethyl styrene, para-isopropyl styrene, divinyl benzene, vinyl naphthalene, etc. The invention is particularly concerned with production of rods, bars, and the like of the polymerized vinyl aromatic compounds, which polymers are hereinafter referred to generically as "vinyl aromatic resins."

It is known that such polymerizable compounds contract in volume during polymerization and cooling and that the shrinkage often causes bubbles or other flaws in the polymerized products. The tendency toward bubble formation becomes more pronounced as the size of the articles to be produced is increased, and bubbles frequently occur in articles having a thickness or diameter greater than 0.5 inch when such articles are produced by the usual thermal polymerization of the starting material in a mold.

The difficulty of polymerizing vinyl compounds in a mold to produce directly flawless articles has been recognized in the art, and a number of methods for carrying out the polymerization so as to avoid the flaws due to shrinkage have been proposed. These previously known methods appear to involve a common principle; viz., the material should be polymerized in a thin layer or as a rod of small diameter. Certain of these methods involve gradually advancing a narrow heating zone through a body of the material to be polymerized while maintaining the material ahead of the heating zone relatively cool, and others involve other expedients for polymerizing the material in successive layers, such as charging a mold with successive layers of the polymerizable starting material containing a polymerization catalyst in diminishing concentrations, and then heating the charge to effect polymerization.

Of these previously known methods, only that disclosed in U. S. Patent No. 2,057,673 is adapted to the production of flawless rods of indefinite length, and the method of this patent involves certain operating difficulties. According to the patent, a rod of indefinite length is prepared by first plugging one end of a horizontal tubular mold with the polymeric product, charging the remainder of the mold with the monomer under moderate pressure and then applying heat to a narrow zone at the closed end of the mold until polymerization in that zone is completed, and progressively advancing the heating zone along the major axis of the mold at the rate required to effect polymerization while maintaining the liquid in advance of the heating zone sufficiently cool to prevent active polymerization. After polymerizing the entire charge in such manner, the mold and its contents are cooled, the rod of polymeric material is partially withdrawn, the mold is recharged with monomeric material, and polymerization as just described is repeated. This method is disadvantageous from a manufacturing viewpoint in that it requires both positive heating and positive cooling during polymerization with very careful control of the temperatures and the rate of advance of the narrow heating zone, and it further requires the extra steps of periodically ceasing polymerization and cooling the entire body of polymer to shrink it from the walls of the mold and permit its withdrawal so that the mold may be refilled and polymerization be continued.

It is an object of this invention to provide a relatively simple method, free from the above-mentioned operating difficulties, for the production of flawless rods, bars, or similar articles of any desired length.

I have discovered that in the production of finished rods, etc., by polymerizing an organic compound in a mold, the occurrence of flaws of the type caused by shrinkage may be avoided merely by gradually advancing the filled mold into and through a heated zone to cause polymerization while charging the liquid to be polymerized into the mold at a pressure sufficient to compress the polymerizing material into a compact uniform mass and thus to overcome the shrinkage which occurs. When operating in such manner, no cooling other than that due to radiation is required (although cooling may, if desired, be resorted to), and the heating need not be confined to a narrow zone, but may be extended over as great a portion of the mold's length as desired. By extending the zone of heating over a considerable part, e. g. 4 feet or more, of the length of the mold, instead of confining the heating to an advancing narrow zone, the time required for polymerizing a given length of rod is shortened.

I also have devised a simple method which permits the continuous polymerization of a vinyl compound to produce bubble-free rods or bars of as great length as desired.

The accompanying drawing shows apparatus suitable for use in practicing the invention. Fig. 1 of the drawing is a side view of the apparatus; Fig. 2 is a cross-sectional end view of the section indicated as "A—A" in Fig. 1; and Fig. 3 is a top cross-sectional view of the abutting ends of two sections of a mold. In Fig. 1, the numeral 1 designates an oven, which is heated by any conventional means, not shown. The numeral 2 indicates a non-movable piston having a central bore 3 which permits the passage of liquid therethrough. Piston 2 is connected with a hollow shaft or conduit 4 which is supported by a wall or other supporting member 7. Conduit 4 connects with pump 5 which in turn is connected by conduit 6 with a reservoir not shown. Encompassing piston 2 and extending through oven 1 is tubular mold 8 which consists of an assemblage of individual mold parts 8—a and 8—b. The mold rests upon and is capable of moving lengthwise on a supporting track 13. A brake assemblage is provided to impede movement of mold 8 along track 13 in the direction away from piston 2 and at the same time to maintain a pressure on liquid within the mold. The brake assemblage consists of a brake cable 9, its supporting cable drums 11 and 12, and a weight 10 attached to one end of the cable. The other end of the cable is fixed to one of the drums over which it passes and the mold 8 is clamped or otherwise attached to the cable at one or more points.

In Fig. 2, the numeral 1—a designates the wall of oven 1. 8—a is an upper half and 8—b a lower half of mold 8. Each half is provided with the projecting lips 15 and 16, respectively, which lips are drilled for passage of the connecting bolts 17 therethrough. The lower half of the mold, 8—b, is provided with a cable-gripping member 14. The latter is provided with rollers 20 which rest on track 13 and support the mold on the track. Member 14 grips the cable 9 as indicated in the drawing.

In Fig. 3 of the drawing, adjoining lengths of the tubular mold are designated by the numeral 8—b. Each mold length is provided at its end with a circular flange 18, which is drilled with bolt holes. The bolts 19 passing through the flanges 18 draw the adjoining mold lengths together, thus forming a single tube.

In manufacturing a rod of polystyrene with the apparatus shown in the drawing, a length of the tubular molding is assembled and closed at one end with a metal cap or preferably a plug of solid polystyrene. The length of molding is placed on track 13 in such position as to have the piston 2 and conduit 4 projecting therein through the open end of the mold to a point at which the face of piston 2 fits snugly against the cap or plug at the other end of the mold. The length of molding is then anchored firmly to the brake cable 9 by means of the clamps 14.

Oven 1 is heated to a temperature sufficient to cause smooth, but fairly rapid, polymerization of styrene, e. g. usually to a temperature between 70° and 170° C., and liquid styrene, which preferably has been boiled to remove any absorbed air or other gases therefrom is pumped from a drum or other reservoir into the mold by means of the inlet 6, pump 5, conduit 4 and the bore 3 in piston 2. This introduction of liquid styrene into the mold through the bore of the stationary piston 3 forces mold 8 to move to the left along track 13 against the restraining force of brake cable 9 and weight 10, thus maintaining the styrene in the mold under considerable pressure, preferably under a pressure between 50 and 250 pounds per square inch. The pressure exerted on the charge within the mold is dependent upon the weight 10 attached to cable 9 and may be varied, if desired, by changing that weight. The rate at which liquid styrene is pumped into the mold (and that the latter is thereby caused to move to the left through oven 1) may be varied considerably, the optimum rate being dependent upon a number of variable factors, such as the rate of polymerization which in turn is dependent in part upon the temperature of the oven; the distance the mold travels in passing through the oven; the internal diameter of the mold; etc. However, when using a tubular mold having an internal diameter of 3 inches and an oven of such size that the mold must travel 10 feet in passing through the same and operating at an oven temperature of between 100° and 150° C., we find that styrene may satisfactorily be charged into the mold at a constant rate of about 116 cubic centimeters per hour, thereby causing the mold to move to the left along track 13 at a rate of about 1 inch per hour. When using molds of larger diameter, slower lengthwise movement of the mold may be required.

As the mold moves to the left through the oven, additional mold sections are periodically assembled around the conduit 4 and are connected with the mold moving through the oven to form an extension of the same. Similarly, the portion of the mold emerging from the oven is permitted to cool by traveling a short distance therefrom, usually 4 feet or more from the oven wall, at which time the mold section to the left is disassembled, exposing the rod of polystyrene. Other mold sections are disassembled as they move into similar position away from the oven. The portion of the polystyrene rod remaining within the mold seals the latter against leakage of the styrene which is constantly pumped into the mold. The bubble-free polystyrene rod produced by this continuous polymerization method may be cut into any lengths desired. The rod is of uniform diameter and possesses a smooth finish.

It will be apparent that the invention is not limited to the production of rod. By using a sectional mold similar in design and assemblage to that hereinbefore described, except that it has a square instead of circular bore, square bars of polymer may be produced. The sectional mold may also be designed so as to produce angles, I-beams, etc., as desired. By having suitable indentations on the inner surface of the mold sections, rods or bars, etc., having designs or other desired markings on their outer surface are readily produced.

It will also be apparent that changes may be made in the apparatus hereinbefore described without departing from the invention. For instance, in place of the brake assemblage illustrated in the drawing, any means for applying a substantially constant force opposing the forward motion of the mold may be used. Such means may consist of a friction shoe applied against the outer surface of the mold, etc.

As hereinbefore pointed out, the method and apparatus disclosed may be used to prepare rods or other lengthy articles from any liquid organic compound which is readily polymerized by heat to a glass-like solid, and they are particularly well adapted to the production of such articles from vinyl aromatic compounds and their mixtures with other unsaturated organic compounds which co-polymerize therewith.

Other modes of applying the principle of the invention may be employed instead of those explained, change being made as regards the method herein disclosed, provided the step or steps stated by any of the following claims or the equivalent of such stated step or steps be employed.

I therefore particularly point out and distinctly claim as my invention:

1. A method for the continuous polymerization of polymerizable organic compounds to produce elongated solid articles of desired length which comprises introducing a liquid polymerizable organic compound under pressure at a fixed position into an elongated movable sectional container in such manner as to cause the container to move gradually in a direction lengthwise of the container and away from said fixed position by the force exerted thereon by the liquid, exerting a force on the container to restrain the movement thereof so as to compress the charge therein as a compact body substantially free of bubbles, causing the container in its lengthwise movement to travel slowly through a heating zone wherein it is heated sufficiently to polymerize the liquid organic compound and thence into a cooler zone wherein the polymer hardens while under the imposed pressure, and from time to time extending the walls of the container at a position preceding entrance of the latter into the heating zone and in a direction opposite the direction of movement of the container and removing sections of the container from the hardened polymer.

2. A method for the continuous polymerization of styrene to produce elongated polystyrene articles of desired length which comprises introducing styrene under pressure at a fixed position into an elongated movable sectional container in such manner as to cause the container to move gradually in a direction lengthwise of the container and away from said fixed position by the force exerted thereon by the liquid, exerting a force on the container to restrain the movement thereof so as to compress the charge therein as a compact body substantially free of bubbles, causing the container in its lengthwise movement to travel slowly through a heating zone wherein it is heated sufficiently to polymerize the styrene and thence into a cooler zone wherein the polystyrene hardens while under the imposed pressure, and from time to time extending the walls of the container at a position preceding entrance of the latter into the heating zone and in a direction opposite the direction of movement of the container and removing sections of the container from the hardened polystyrene.

DONALD L. GIBB.